June 30, 1959     T. E. BAILEY     2,892,442
WIPER DIE

Filed Aug. 10, 1956     2 Sheets-Sheet 1

INVENTOR.
THOMAS E. BAILEY
BY
D. Gordon Angus
ATTORNEY.

June 30, 1959     T. E. BAILEY     2,892,442
WIPER DIE
Filed Aug. 10, 1956     2 Sheets-Sheet 2
Fig. 3
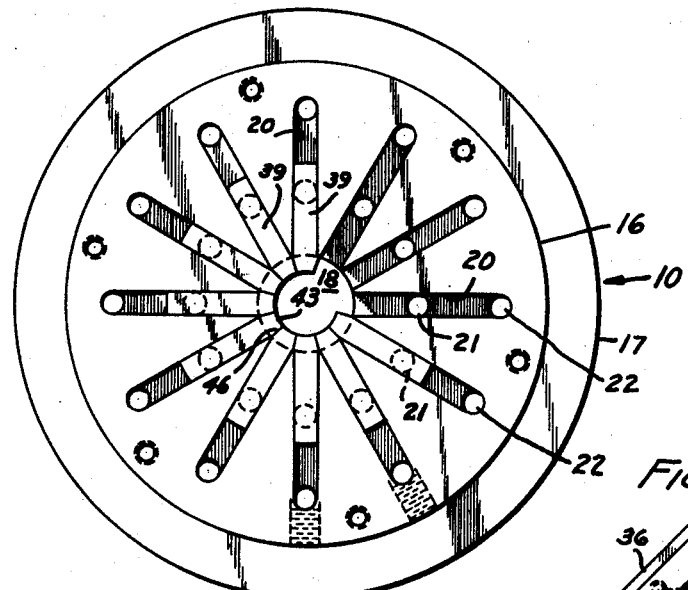
Fig. 4
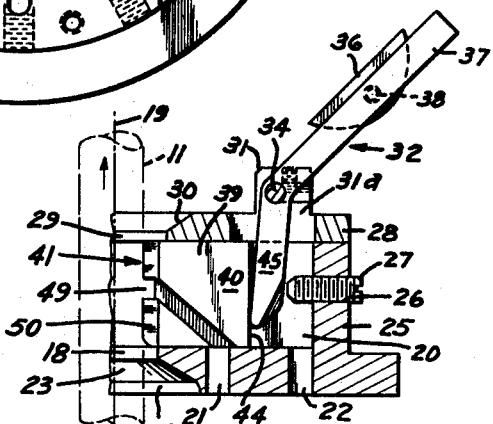
Fig. 5
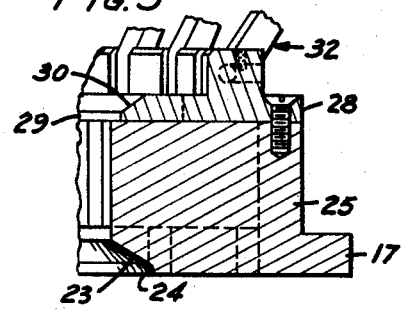
Fig. 8    Fig. 7    Fig. 6
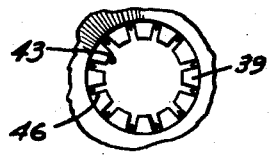 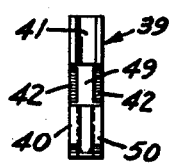 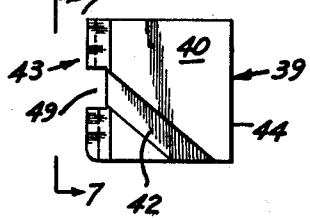
Fig. 9
INVENTOR.
THOMAS E. BAILEY.
BY
D. Gordon Angus
ATTORNEY.

United States Patent Office 2,892,442
Patented June 30, 1959

2,892,442
WIPER DIE

Thomas E. Bailey, North Hollywood, Calif., assignor, by mesne assignments, to The Borden Company, New York, N.Y., a corporation of New Jersey Application August 10, 1956, Serial No. 603,440

8 Claims. (Cl. 118—125)

This invention relates to means for applying coatings, and in particular to a die for applying layers in the manufacture of reinforced multi-layer hose.

One well-known type of plastic hose comprises a multiple layer structure, wherein a hose core which is made of a plastic formulation compounded for given properties such as water resistance is covered by a layer of another plastic formulation which is compounded for other properties such as abrasion resistance. This hose is commonly made by extruding the core from a conventional extrusion machine, thereafter immersing the hose core in a bath of plastisol, passing the plastisol-covered hose core through a wiper die to remove excess plastisol and distribute the correct quantity on the hose core, and then heat-curing the hose structure. Such a hose is shown in United States Patent No. 2,645,249 to Davis et al., and a machine for manufacturing it is shown in United States Patent No. 2,626,426 to Oscar C. Stahl.

In manufacturing hoses with the above process, it has been customary to utilize a simple cylindrical collar for the wiper die. This type of die works well when both the hose core and the outer layer are cylindrical in outer conformation. In the manufacture of smooth, cylindrical hose, a simple cylinder collar is desirable and extensively used, because of its low initial cost, and lack of maintenance expense. It has no moving parts to make, adjust or maintain.

As an improvement to the hose shown in the Davis patent, a braid-reinforcement is commonly provided between the inner core and the outer hose layer. This reinforcement increases the life of the hose, and also enables the hose to resist higher pressures. For this type of hose, the manufacturing process shown in the aforementioned Stahl et al. patent is augmented by weaving, winding, or otherwise applying a reinforcement of fibers (hereinafter called a "braid-reinforcement") on the surface of the inner core prior to the application of the outer layer. The braid-covered hose core is then dipped in plastisol, passed through a wiper die, and cured.

Considerable difficulty was encountered in applying an outer layer of even thickness over the braid-covered inner hose core. This is for the reason that the surface of the hose core structure itself is no longer a smooth cylinder, but is "treaded" by the braid. The outer layer, as provided by a simple collar-type die, was often thinner over the braid, then in the spaces between the braid. In addition small sideward movements which the hose sometimes makes as it passes through the simple collar often results in areas on the surface of the hose where there is little or no outer layer at all.

Investigation of the above deficiencies showed that one of the difficulties with the simple collar die was its inability to apply an even layer over a varying cross-section, apparently because of the unyielding die wall. Accordingly, it is an object of this invention to provide a wiper die which is able to apply and distribute a layer of substantially uniform thickness on an inner body such as a hose core, which inner body has a varying outer configuration.

According to this invention, the wiper die has a body with an axial central port. A plurality of radial, axially extending slots are formed in the die body within which slots radially reciprocable die plates are placed. These plates move centrally toward the central axis of the port so as to make edge-to-edge abutment with each other and thereby create a central die orifice with a continuous wall. Each of the inner edges may be modified by grooves or the like so as to give the die orifice the desired cross-section.

A feature of this invention resides in means for yieldingly biasing the plates toward the central axis, whereby the die plates tend to maintain the desired die orifice configuration.

A preferred but optional feature resides in reservoir means disposed in a medial position along the inner edge of the die plates and means for draining said reservoir, whereby a desired quantity of plastisol can be maintained at said medial position and assured an adequate, but not excessive, quantity of plastisol for the outer layer.

The above and other features of this invention will be fully understood from the following detailed description and the accompanying drawings, of which:

Fig. 3 is a cross-section view taken at line 3—3 of Fig. 1, with some elements removed for purposes of illustration;

Fig. 4 is a partial cross-section taken at line 4—4 of Fig. 2;

Fig. 5 is a partial cross-section taken at line 5—5 of Fig. 2;

Fig. 6 is a side elevation of a die plate used in the die of Fig. 1;

Fig. 7 is a side view taken at line 7—7 of Fig. 6;

Fig. 8 is a fragmentary top view of the die of Fig. 1, showing the die plates in a retracted position; and Fig. 9 is a side elevation; of a partly-constructed hose showing the irregular contour of an inner hose core with a braid covering applied thereto, to which an outer layer is to be applied to make a multi-ply hose.

Figure 1:
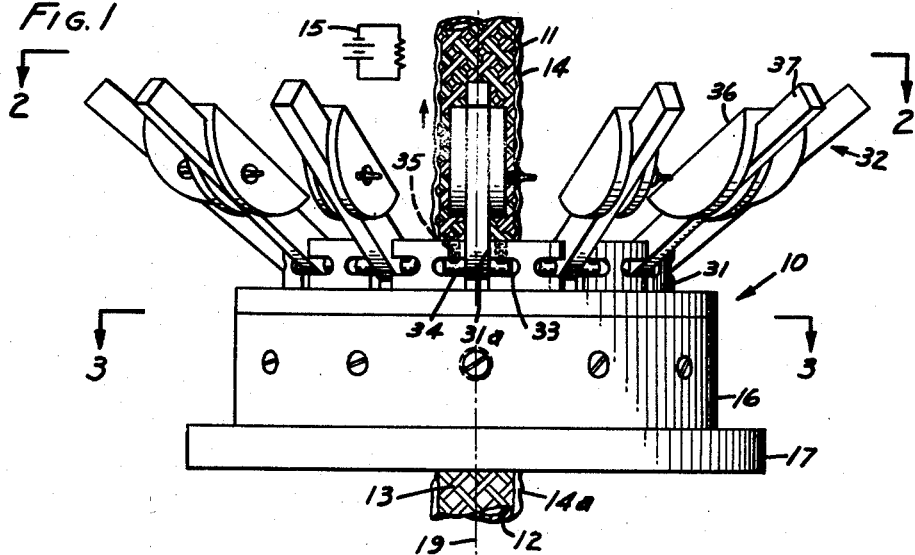
Fig. 1 is a side view of a wiper die according to this invention.

In Fig. 1 there is shown a wiper die 10 according to this invention. This die is shown in use controlling the thickness of an outer layer being applied on an inner core. The hose 11 being manufactured is moving in an upward direction in Fig. 1, although the hose may be run downward through the die with similar effect.

The hose being manufactured has an inner core 12, a braid reinforcement 13, and an outer layer 14 which covers both the inner core and the braid. The braid-covered inner core is shown in Fig. 9, while the outer layer, before and after curing, is shown below and above the die, respectively, in Fig. 1. Fig. 9 illustrates the irregular contour of the outer wall of the braid-covered hose core to which an outer layer of sensibly constant thickness is to be applied by means of this wiper die. This braid-covered inner core will have been immersed in a plastisol prior to passing through the wiper die 10, and the irregular distribution of the plastisol following this immersion will be appreciated from the condition of the adherent plastisol at 14a in Fig. 1. After the wiper die has determined the quantity of plastisol 14a, which remains on the inner core, and its distribution, the hose is heat-cured by such means as a heater 15, and the plastisol becomes the outer layer.

As illustrated in Fig. 1, the finally-cured hose beyond the heaters has a treaded, diamond-studded surface. This is caused by the expansion of the inner core during curing. The braid does not expand, and therefore the core protrudes through the braid. The outer layer conforms to this treaded shape, and comprises a layer of sensibly constant thickness when the hose is properly made.

The wiper die 10 has a body section 16 with a mounting flange 17. A central opening 18 (see Fig. 3) is coaxial with the axis 19 of the die. Radial slots 20 are cut in the body section, which extend parallel to the axis. The extension of their planes would include this axis. A first drain port 21 is drilled through the bottom of the body section to intersect the bottom of each slot at a medial point thereof, and a second drain port 22 is similarly drilled to intersect said slots near their radially outermost points.

The central opening 18 has an inverted funnel-shaped section 23 at the bottom thereon (see Fig. 4) which terminates at a cylindrical section 24 just below said slots. The outer wall 25 of the body section has a radially extending threaded opening 26 to receive a limit screw 27 for a purpose to be discussed below.

A top section 28 seats atop the body section. The top section has a central opening with a cylindrical segment 29 which is coaxial with axis 19. A funnel-shaped segment 30 extends downward from the upper side of the top section to the cylindrical segment 29.

A cylindrical flange 31 (see Figs. 1 and 4) on the upper side of the top is provided with vertical, radial slots 31a to receive a lever 32, and with horizontal slots 33 for receiving a pivot pin 34. One pivot pin is attached to each of the levers. A pair of set screws 35 hold each pivot pin in its horizontal slot. Each lever thereby can rock in a vertical, radial plane which plane preferably includes the axis 19.

A counterweight 36 is attached to the upper outer arm 37 of each lever. The counterweights have a U-shaped cross-section so as to straddle the arm. A set screw 38 in each counterweight holds the counterweight in an adjusted position. The force exerted by the lever against its die plate may thereby be adjusted.

A die plate 39 is slidably disposed on each slot 20 so as to be movable toward and away from the axis 19, so as to comprise a yieldable member movable toward and away from the outer wall of the hose core. Each die plate (see Figs. 6 and 7) has flat sides 40 which slide along the flat boundary sides of the slots. In these flat sides 40 there is milled a conduit 42 on each side of the plate. This conduit extends from a medial portion of the inner edge 43 of the plate, downward and radially outward to the drain port 21. The conduit 42 and the drain port are in fluid communication at all operational positions of the die plates. The top and bottom surfaces of the die plates are flat planes. The top of the plates slide along under the lower surface of the top section, and the bottom of the plates slide along the bottom of the slots 20. The outer edge 44 of the plates is preferably flat and is contacted by the lower arm 45 of the lever 32. It will be seen that the effect of the counterweight 36 on the lever 32 is to press the lower arm 45 against the die plate and force the die plate toward the central axis 19.

Figure 2:
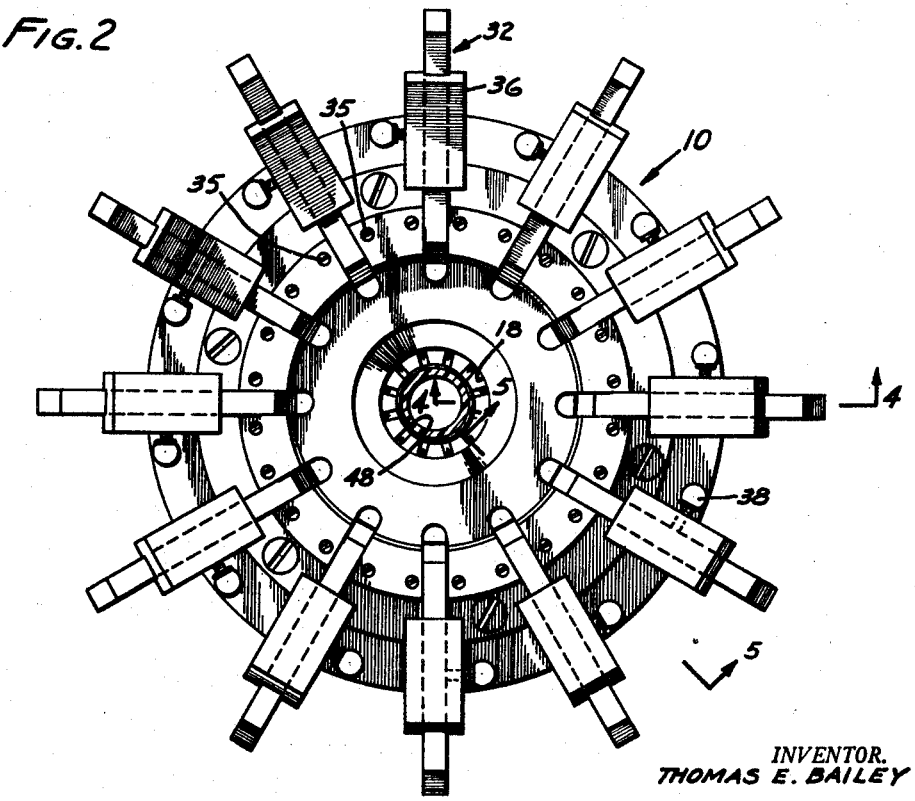
Fig. 2 is a top view taken at line 2—2 of Fig. 1.

The inner edge of each die plate is provided with a die face 41 for determining the shape of a segment of the outer surface of the outer hose layer 14. In Figs. 2 and 3, it will be observed that each of the plates has a tapering inner end section 46 so that when all of the plates are simultaneously forced toward the center of the die faces 41 of the various plates will form a continuous circular die orifice 48 with a continuous wall made up of contiguous die faces 43 of the die plates 39. At a medial portion of each die plate, a reservoir 49 (see Fig. 4) is formed, which is in fluid communication with the conduit 42 (see Fig. 7). The upper segment 41 of each inner edge is broad and smooth, and provides the surface shown in end view in Fig. 3. The lower segment 50 of the inner edge, which is disposed below the reservoir 49 is cut somewhat deeper than the upper segment so as to permit plastisol to be carried by the hose to the reservoir. This keeps the reservoir filled and overflowing into conduit 42.

The operation of this die in producing a uniform outer layer on a hose of irregular contour will now be described. After the braid-covered inner core of Fig. 9 has been immersed in plastisol, it is conveyed by pulley wheels or by any other desired means (not shown) to the wiper of Fig. 1. As illustrated in Fig. 1 the hose core with adherent liquid plastisol is passed upward through the die orifice. It will be understood that the plastisol on the surface of the inner core when the hose core reaches the wiper die is generally unevenly distributed. Furthermore, the rate of passage of the hose through the die and the viscosity of the plastisol are so adjusted relative to the die clearance that an excess of plastisol is present on the hose over what is needed to form the outer layer when the hose core reaches the wiper die. The wiper die always must remove platsisol from the hose and this adjustment results in a collection of plastisol in reservoir 49. This assures a sufficient supply of plastisol at the wiper die to form the outer layer. If insufficient plastisol were present then a proper outer layer could never be formed. The wiper die 10 acts to remove excess plastisol from the hose core and to distribute the correct amount over the hose surface.

As the plastisol covered inner core enters the die in the direction indicated in Fig. 4, the lower segment 50 of the die faces of the die plates will wipe off some of the excess plastisol, while the deeper groove in said lower segment passes a small, regulated amount of excess of plastisol to the reservoirs 49. That plastisol which is wiped off by the lower segment of the plates flows down the hose toward the source of the plastisol, or flows down the inverted funnel section 23 toward the same destination, which may be a tank, for example. The necessary plastisol for the outer layer, along with a slight, regulated excess as described above, travels with the hose to the region adjacent the reservoirs 49 in the die plates. At this point, the upper segment 41 of the die face removes all but the exact amount of plastisol which is necessary to form the outer layer. Excess plastisol, being viscous, flows into the reservoirs and keeps the reservoir 49 fairly full, while the excess flows through conduit 42 and drain ports 20, so as to be returned to the source of the plastisol. This reservoir assures a sufficiency of plastisol at the surface of the hose, thereby removing the risk that sufficient plastisol might be momentarily lacking to provide an adequate outer layer. It has been found that this reservoir greatly reduces the reject rates in continuous hose production.

In the manufacture of a hose having an uneven outer surface, an unyielding die orifice wall has a tendency to fail to provide adequate plastisol for the outer layer, and also fails to distribute the plastisol properly. Therefore, as the outer contour of a hose core to be covered varies, say by the approach of the surface of the hose, or of the braid, toward a die plate, the fluid pressure against the plate builds up and shifts the die plate away from the hose against the force exerted by the counterweight 36. This provides an increased spacing between the core surface and the wiper die which will, of course, increase the amount of plastisol applied at that point over that which would be applied by a die having an orifice with an uneven wall.

The maximum amount of yielding can be adjusted by the releasing the set screws 38 and moving the counterweights 36 toward or away from the pivot pins 34. This varies the force which the lever exerts toward the hose core, and the force needed to be exerted by the hose to cause the die plates to be yieldingly displaced is thereby determined.

It will be understood, of course, that when the individual plates are pushed back, or retracted, by the hose, the die orifice will become slightly out of round or may even become somewhat discontinuous. The maximum discontinuity is shown in Fig. 8, where all of the die plates are shown in their retracted position, leaving gaps between each one of the plates. However, these gaps do not leave ridges on the completed hose, because the plastisol flows somewhat while it is being cured. In operation, it usually occurs that only one or two of the plates are retracted at any given time, and these usually are only slightly retracted.

The theory of operation of this die is as yet imperfectly understood. It appears that the provision of a reservoir at a medial point of the die faces provides a necessary margin of supply of plastisol to assure an adequate outer layer for the hose. With respect to the shifting of the individual die plates, it appears that as the hose approaches the individual die plate, there is built up a pressure which seems to retract the die plate without causing any contact between the plate and the hose core or the braid, for it has been found that plastisol is not scraped away from the core or braid by the upper segment 43 of the inner edge, but that there is always an adequate supply of the plastisol thereon to form the outer layer. It is necessary, of course, to adjust each one of the counter-weights individually so as to provide the correct balance between the rate of movement of the hose through the die, the viscosity of the plastisol and the yieldable force tending to move the die plate toward the hose core. No general rule has yet been found to establish the exact values of this inter-relationship, it being an experimental matter which must be determined when the tooling is being set up at the start of each major hose manufacturing run. By means of this wiper die, it has been found possible to produce hose with an irregular outer contour which has a suitable and sensibly uniform outer layer thereon, with a low reject brake. When it is considered that hose of this sort is manufactured in a continuous process to produce perhaps millions of feet in a single run, and that pieces are seldom cut to less than 50 foot lengths, it will be appreciated that a flaw somewhere in the 50 foot length can be an expensive matter inasmuch as small segments of hose are not economically salvageable. Rejected hose lengths are simply ground up for remanufacture into hose of lesser quality. It has been found that by the use of this die, the scrap rate has been drastically reduced, from the rate experienced with previous dies, and the quality of the first rate hose has been enhanced over that which can be manufactured by a die using a simple non yielding die orifice.

This invention is not to be limited to the embodiments shown in the drawing and described in the description which are given by way of example and not of limitation, but only in accordance with the scope of the appended claims:

I claim:

1. A wiper die for determining the thickness and distribution of a liquid coating material, said material to be applied to the outer wall of an elongated object having an axis, comprising: a body having an opening therethrough for passing said object; a plurality of slidable members disposed in said body and extending into said opening, said members being moveable toward and away from the outer wall of an object within the opening; a die face on each of said members on the side of said member which is nearest to the said wall when the object is within said opening; and means for yieldingly forcing the said members toward the said wall, comprising a lever for each of said members, said lever comprising a pivot and two arms, one of said arms bearing against said member, and a counterweight on the other of said arms, whereby the wiper die removes liquid coating material in excess of a predetermined quantity from said wall, and whereby variations in the outer contour of said object cause the slidable members to move relative to the wall so as to maintain a sensibly constant coating thickness.

2. A wiper die for determining the thickness and distribution of a coating material, said material to be applied to the outer wall of an elongated object having an axis, comprising: a body having an opening therethrough for passing said object; a plurality of members in said opening, said members being moveable toward and away from the outer wall of an object within the opening; a die face on each of said members on the side of said member which is nearest to the said wall when the object is within said opening; means for yieldingly forcing the said members toward the said wall; reservoir means in said die face so disposed and arranged that said reservoir means opens onto said object when the object is in the opening; and conduit means leading from said reservoir for draining the same, whereby the wiper die removes liquid coating material in excess of a predetermined quantity from said wall, and whereby variations in the outer contour of said object cause the yieldable members to move relative to the wall so as to maintain a sensibly constant coating thickness.

3. A wiper die for determining the thickness and distribution of a liquid coating material, said material to be applied to the outer wall of an elongated object having an axis, comprising: a body having an opening therethrough for passing said object; a plurality of slidable members disposed in said body and extending into said opening, said members being moveable toward and away from the outer wall of an object within the opening; a die face on each of said slidable members on the side of said member which is nearest to the said wall when the object is within said opening; means for yieldingly forcing the said members toward the said wall, comprising a lever for each of said members, said lever comprising a pivot and two arms, one of said arms bearing against said member, and a counterweight on the other of said arms for yieldably forcing the member toward the object; rerervoir means in said die faces which open onto said object when the object is in the opening; and conduit means leading from said reservoir means for draining the same, whereby the wiper die removes liquid coating material in excess of a predetermined quantity from said wall, and whereby variations in the outer contour of said object cause the slidable members to move relative to the wall so as to maintain a sensibly constant coating thickness.

4. A wiper die comprising: a body section having an opening therethrough to receive a die orifice, and having slots extending radially outward from said opening; a die plate disposed in each of said slots; a die face on the innermost edge of each die plate, whereby, when all of the die plates are moved toward the axis of the opening, the plates abut so that their die faces form a continuous wall for said die orifice; means for yieldingly biasing said die plates toward the said axis; a reservoir in the die face of each die plate; and means for draining the said reservoirs.

5. In a wiper die, the combination of: a body section having an opening therethrough and having slots extending radially outward from said opening; a die plate disposed in each of said slots; two axially disposed die faces on the innermost edge of each die plate, whereby, when all of the die plates are moved toward the axis of the opening, the plates abut so that their die faces form first and second continuous walls with the diameter of the first continuous wall being greater than the diameter of the second continuous wall; a reservoir positioned between the die faces of each die plate; means for draining said reservoirs; and means for yieldingly biasing said die plates toward said axis.

6. In a wiper die for determining the thickness and distribution of a coating material being applied to the outer wall of an elongated object, the combination of:

a body having an opening therethrough for passing the object; a plurality of members in said opening, said members being movable toward and away from the outer wall of the object passing through the opening; first and second axially disposed die faces on each of said members on the side of said member which is nearest to the wall when the object is within said opening, said first die face extending radially beyond said second die face; means for yieldingly forcing said members toward the wall of the object; reservoir means in each of said members positioned between the die faces thereof and so disposed and arranged that said reservoir means opens onto the object when the object is in said opening; and conduit means leading from said reservoir means for draining same.

7. A wiper die for determining the thickness and distribution of a liquid coating material, said material to be applied to the outer wall of an elongated, substantially cylindrical object having an axis, comprising: a body having an opening therethrough for passing said object; a plurality of members in said opening, said members being movable toward and away from said wall along paths perpendicular to said axis; a fixed die face on each of said members on the side of said member which is nearest to said wall when the object is within said opening, each of said die faces having a smooth, continuous surface of the same contour as the object being coated, with said surface extending along lines parallel to said axis; and means for yieldingly forcing said members toward said wall, whereby the wiper die removes liquid coating material in excess of a predetermined quantity from said wall, and whereby variations in the outer contour of said object cause the yieldable members to move relative to the wall so as to maintain a smooth, sensibly constant coating thickness.

8. In a wiper die for determining the thickness and distribution of a coating layer to be applied to the outer surface of an elongated object which has an axis, the combination of: a die orifice through which the object is passed along its axis; and a wall for said die orifice comprising a plurality of members which are individually movable toward and away from said object when it is within said orifice, with each of said members having a reservoir at an intermediate point of its surface adjacent to the object.

References Cited in the file of this patent
UNITED STATES PATENTS

| | | |
|---|---|---|
| 431,905 | Matteson | July 8, 1890 |
| 1,994,802 | Adams | Mar. 19, 1935 |
| 2,062,389 | Bleiber | Dec. 1, 1936 |
| 2,257,432 | Smith | Sept. 30, 1941 |
| 2,320,246 | Rayburn | May 25, 1943 |
| 2,407,337 | Kolter | Sept. 10, 1946 |
| 2,536,186 | Keller | Jan. 2, 1951 |

FOREIGN PATENTS

| | | |
|---|---|---|
| 621,265 | Great Britain | Apr. 6, 1949 |